United States Patent
Kusumoto et al.

(10) Patent No.: US 6,221,533 B1
(45) Date of Patent: Apr. 24, 2001

(54) NONAQUEOUS ELECTROLYTE BATTERY

(75) Inventors: Yasuyuki Kusumoto, Hirakata; Ryuji Ohshita, Nevagawa; Toshiyuki Nohma; Koji Nishio, both of Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/238,072

(22) Filed: Jan. 27, 1999

(30) Foreign Application Priority Data

Jan. 29, 1998 (JP) ................................................ 10-017392

(51) Int. Cl.[7] .................................................. H01M 10/08
(52) U.S. Cl. .......................... 429/328; 429/311; 429/322; 429/323; 429/324
(58) Field of Search .................................. 429/188, 311, 429/324, 322, 323, 328

(56) References Cited

U.S. PATENT DOCUMENTS 5,783,333 * 7/1998 Mayer .................................. 429/223
6,007,947 * 7/1998 Mayer .................................. 429/231.1

FOREIGN PATENT DOCUMENTS 197 57 126 * 6/1999 (DE) ............................ H01M/10/40
11214016 * 8/1999 (JP) ................................. H01M/6/16

OTHER PUBLICATIONS

Wang, X. et al.; "Lithium Imide Electrolytes with Two–Oxygen–Atom–Containing Cycloalkane Solvents for Lithium Metal Rechargeable Batteries"; Journal of the Electrochemical Society, 147(7), 2421–2426, (2000).*

Arai, J. and Peter, L.; "Anodic Dissolution of Aluminum in Organic Electrolytes Containing Perfluoroalkylsulfonyl Imides"; Journal of Applied Electrochemistry, 29; 1053–1061, 1999.*

* cited by examiner

Primary Examiner—Carol Chaney
Assistant Examiner—Mark Ruthkosky
(74) Attorney, Agent, or Firm—Kubovcik & Kubovcik

(57) ABSTRACT

A nonaqueous electrolyte lithium primary or secondary battery having improved storage property is disclosed. The battery includes a positive electrode; a negative electrode in which the active material is lithium, a lithium alloy or a compound capable of occluding and discharging lithium; and a nonaqueous electrolyte including a solvent containing at least 10 wt % of dioxolane or derivative of dioxolane and an electrolytic solute represented by $LiN(C_mF_{2m+1}SO_2)(C_nF_{2n+1}SO_2)$ (where m is a natural number of 1 or greater, and n is a natural number of 2 or greater).

14 Claims, 1 Drawing Sheet

NONAQUEOUS ELECTROLYTE BATTERY

FIELD OF THE INVENTION

The present invention relates to an improvement in the storage property of a nonaqueous battery which uses lithium as an active material.

BACKGROUND OF THE INVENTION

Lithium primary and secondary batteries which use lithium as the negative electrode active material have lately attracted attention as high energy density batteries, and much active research is being conducted.

As a solvent of the nonaqueous electrolyte for these types of batteries, ethylene carbonate, propylene carbonate, butylene carbonate, dimethyl carbonate, diethyl carbonate, sulfolane, dimethoxy ethane, tetrahydrofuran and dioxolane and the like can be used alone or in the form of a mixture of two or more of these substances. As a solute dissolved in the solvent there can be mentioned $LiPF_6$, $LiBF_4$, $LiClO_4$, $LiCF_3SO_3$, $LiAsF_6$, $LiN(CF_3SO_2)_2$, $LiCF_3(CF_2)_3SO_3$ or the like.

It is known that a nonaqueous electrolyte including dioxolane as a solvent improves battery properties (Japanese patent publication (Laid-Open) Sho 60-91565). However, there is a problem when dioxolane is used as solvent that a negative electrode in which lithium is an active material reacts chemically with the dioxolane, and reduces battery capacity after storage.

It is commercially important for this kind of battery to inhibit self-discharge during storage.

OBJECT OF THE INVENTION

An object of the present invention is to reduce self-discharge during storage of a nonaqueous electrolyte battery and to provide a nonaqueous electrolyte which increases storage properties.

SUMMARY OF THE INVENTION

The present invention provides a nonaqueous electrolyte lithium primary or secondary battery having a positive electrode, a negative electrode comprising lithium, lithium alloy or a material capable of occluding and discharging lithium, a nonaqueous electrolyte including an organic solvent containing dioxolane or a derivative thereof in an amount of not less than 10.0 wt %, wherein the nonaqueous electrolyte includes $LiN(C_mF_{2m+1}SO_2)(C_2F_{2n+1}SO_2)$ (1) (where m is a natural number of 1 or greater, and n is a natural number of 2 or greater) as an electrolytic solute. 4-Methyldioxolane and 2-methyldioxolane are illustrated as derivatives of dioxolane.

When the negative electrode is lithium metal, a remarkable improvement can be expected.

It is preferable to contain 0.1~2.0 mol of the electrolytic solute per 1 l of the nonaqueous electrolyte.

A preferable electrolyte can be provided when m is 1 or 2, and n is 2, 3 or 4 in formula (1). Concretely speaking, when m is 1, and n is 2, 3 or 4 in the formula (1), the electrolytic solute is $LiN(CF_3SO_2)(C_2F_5SO_2)$, $LiN(CF_3SO_2)(C_3F_7SO_2)$ or $LiN(CF_3SO_2)(C_4F_9SO_2)$, respectively, and when m is 2, and n is 2, 3 or 4 in formula (1), the electrolytic solute is $LiN(C_2F_5SO_2)_2$, $LiN(C_2F_5SO_2)(C_3F_7SO_2)$ or $LiN(C_2F_5SO_2)(C_4F_9SO_2)$, respectively.

It is preferable to include a nitrogen-containing compound other than the compound of formula (1) in the nonaqueous electrolyte. 0.01~10.0 wt % of the nitrogen-containing compound in the nonaqueous electrolyte is most preferable. Cyclic nitrogen-containing compounds are preferred and 3,5-dimethylisooxazole and pyridine are illustrated as concrete examples of the nitrogen-containing compounds.

As the other solvent comprising the electrolyte, there can be used ethylene carbonate, propylene carbonate, butylene carbonate, dimethyl carbonate, diethyl carbonate, methyl ethyl carbonate, sulfolane, 3-methyl sulfolane, dimethoxy ethane, tetrahydrofuran, 2-methyl tetrahydrofuran alone or as a mixture of two or more of these. The solvent, of course, is not limited to these.

As the positive electrode for this battery, there can be used a metallic oxide containing of at least one metal selected from the group consisting of manganese, cobalt, nickel, vanadium and niobium. However, the positive electrode is not so limited.

The negative electrode for this battery is lithium, a lithium alloy or a material capable of occluding and discharging lithium, for example, lithium-aluminum alloy, carbon material (for example, coke or graphite) and the like.

If a nonaqueous electrolyte containing 10.0 wt % or more of dioxolane as a solvent of a solvent mixture contains a specific electrolytic solute represented by $LiN(C_mF_{2m+1}SO_2)(C_nF_{2n+1}SO_2)$ (1) (where m is a natural number of 1 or greater, and n is a natural number of 2 or greater), reaction between lithium and the nonaqueous electrolyte can be inhibited. As the result, decomposition of the nonelectrolyte can be inhibited. A storage property of this kind of the nonaqueous electrolyte battery can be improved.

Figure 1:
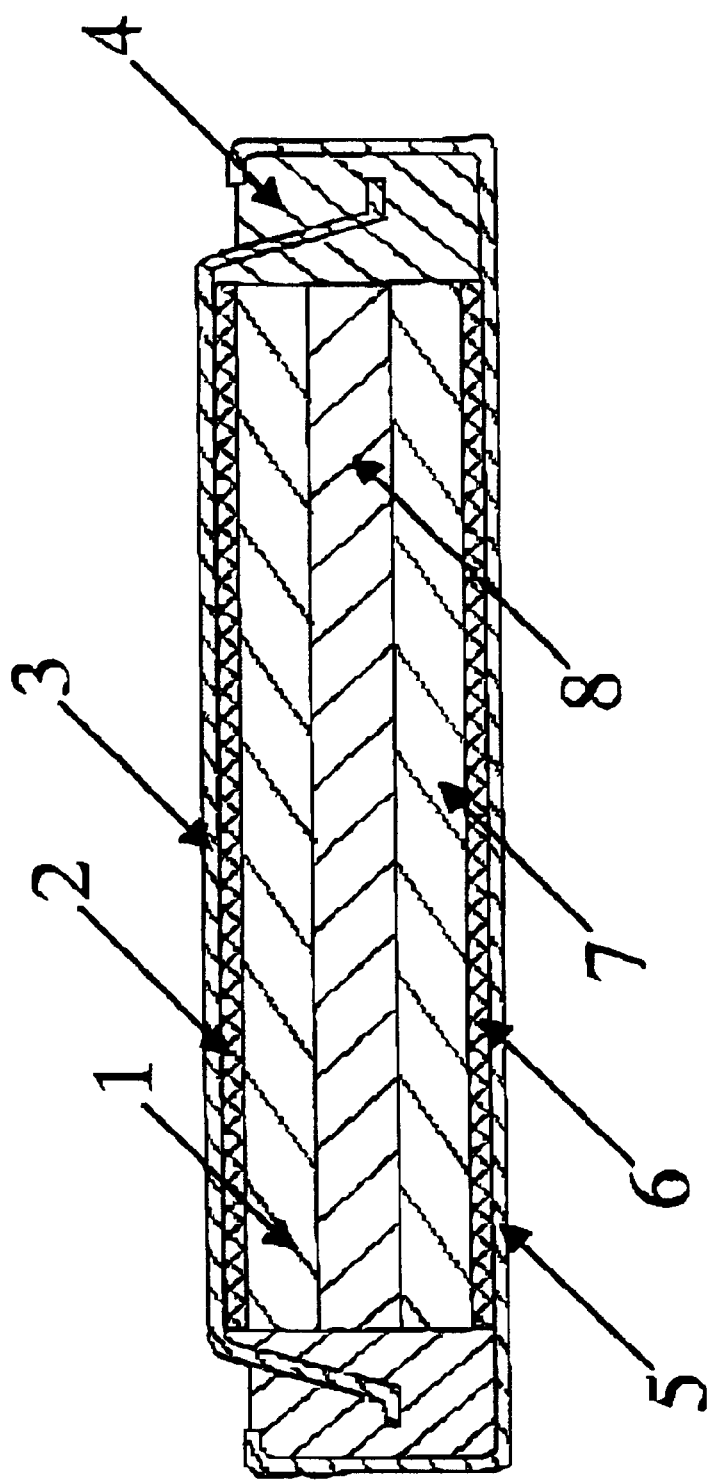
FIG. 1 is a sectional view of a nonaqueous electrolyte battery.

The following elements are shown in the drawing:
1 a negative electrode
2 a negative electrode collector
3 a negative can
4 an insulating packing
5 a positive can
6 a positive electrode collector
7 a positive electrode
8 a separator

DESCRIPTION OF PREFERRED EMBODIMENT

The present invention is described below in detail with reference to the drawing.

EXAMPLE 1

FIG. 1 is a sectional view of a coin-shaped nonaqueous electrolyte battery as an embodiment of the present invention.

Negative electrode (1) was press bonded to the inside surface of negative electrode collector (2). Negative electrode collector (2) is made of ferrite stainless steel (SUS430) and was secured to the bottom of negative can (3) which is C-shaped in section. The edge of negative can (3) was secured in insulating packing (4) made of polypropylene. The outer edge of insulating packing (4) was covered by positive can (5) which is C-shaped in section. Positive electrode collector (6) was secured to the bottom of positive can (5). Positive electrode (7) was secured to the inside of positive electrode collector (6). Separator (8) impregnated with a nonaqueous electrolyte was located between positive electrode (7) and negative electrode (1).

The positive electrode was prepared by mixing manganese dioxide as an active material of the positive electrode, carbon powder as an electrically conducting agent and fluoro resin powder as a binder, at a ratio of 85:10:5 by weight. The manganese dioxide was treated at a temperature of 400° C. Then the mixture was press formed, and dried at a temperature of 300° C.

The negative electrode was prepared by cutting a pressed lithium sheet to a predetermined size.

A nonaqueous electrolyte was prepared as follows. LiN$(C_2F_5SO_2)_2$ as an electrolytic solute was dissolved at a ratio of 1 mol/l in a mixture of propylene carbonate (PC) and dioxolane (DOXL), or in a single solvent of each solvent, at a ratio 10:0~0:10 by weight.

Batteries of the present invention, having an outer diameter of 20.0 mm and a thickness of 2.5 mm, were prepared using these nonaqueous electrolytes.

Batteries of the present invention were also prepared by using LiN$(CF_3SO_2)(C_4F_9SO_2)$ or LiN$(CF_3SO_2)(C_5F_{11}SO_2)$ in the nonaqueous electrolyte instead of LiN$(C_2F_5SO_2)_2$.

Comparative batteries were prepared by using conventional electrolyte solutes, LiN$(CF_3SO_2)_2$ or LiCF$_3$SO$_3$.

Storage property of the batteries was tested as follows:

One of each of the different batteries of the present invention and of the comparative batteries was discharged at room temperature and checked for discharge capacity. One of each of the different batteries of the present invention and of the comparative batteries was stored at a temperature of 60° C. for two months, and thereafter discharged at room temperature at a discharge current of 6 mA to 2.0 V. The self-discharge rate was calculated according to the following formula.

Self-discharge rate (%)=(C1−C2)/C1×100

In the formula, C1 is the discharge capacity before storage, and C2 is the discharge capacity after storage.

Results are shown in Table 1.

TABLE 1

| Weight ratio of solvents PC:DOXL | 10:0 | 9.5:0.5 | 9:1 | 5:5 | 0:10 |
|---|---|---|---|---|---|
| Solute | | | | | |
| LiN$(C_2F_5SO_2)_2$ | 10.0 | 9.3 | 5.2 | 4.2 | 3.7 |
| LiN$(CF_3SO_2)(C_4F_9SO_2)$ | 10.2 | 9.2 | 5.4 | 4.4 | 3.9 |
| LiN$(CF_3SO_2)(C_5F_{11}SO_2)$ | 10.0 | 9.4 | 6.8 | 5.7 | 4.9 |
| LiN$(CF_3SO_2)_2$ (Comparative Example) | 10.1 | 9.8 | 10.2 | 11.1 | 12.0 |
| LiCF$_3$SO$_3$ (Comparative Example) | 10.1 | 10.6 | 11.1 | 12.2 | 13.2 |

Batteries of the present invention which include greater than 10.0 wt % of DOXL on the basis of the mixture of solvents have better results compared to the comparative batteries. That is, self-discharge of the batteries of the present invention was inhibited.

EXAMPLE 2

Batteries of the present invention were prepared in the same manner as Example 1 except that LiN$(C_2F_5SO_2)_2$ or LiN$(CF_3SO_2)(C_4F_9SO_2)$ was added to a mixture of PC and DOXL (5:5 by weight)at a ratio of 1 mol/l to prepare a nonaqueous electrolyte, and a negative electrode was prepared by using lithium or a lithium-aluminum alloy (concentration of aluminum is 1 wt %).

Storage property of the batteries was tested in the same manner as Example 1.

Results are shown in Table 2. Table 2 shows differences between two different negative electrodes and two different electrolytic solutes. Batteries having a lithium negative electrode have inhibited reduction of battery capacity after storage compared to batteries having a lithium-aluminum negative electrode.

TABLE 2

| | Self-discharge rate (%) | |
|---|---|---|
| Negative Electrode | LiN$(C_2F_5SO_2)_2$ | LiN$(CF_3SO_2)(C_4F_9SO_2)$ |
| Li | 4.2 | 4.4 |
| Li-Al | 5.0 | 5.2 |

EXAMPLE 3

Batteries of the present invention were prepared in the same manner as Example 1 except that LiN$(C_2F_5SO_2)_2$ or LiN$(CF_3SO_2)(C_4F_9SO_2)$ was added to a mixture of PC and DOXL (5:5 by weight)at a ratio of 0.01~3.0 mol/l to prepare a nonaqueous electrolyte.

Storage property of the batteries was tested in the same manner as Example 1. Results are shown in Table 3.

TABLE 3

| Concentration of | Self-discharge rate (%) | |
|---|---|---|
| solute (mol/l) | LiN$(C_2F_5SO_2)_2$ | LiN$(CF_3SO_2)(C_4F_9SO_2)$ |
| 0.01 | 9.0 | 9.0 |
| 0.1 | 6.0 | 6.1 |
| 1.0 | 4.2 | 4.4 |
| 2.0 | 5.0 | 5.2 |
| 3.0 | 8.8 | 8.9 |

A concentration of the electrolytic solute in a range of 0.1~2.0 mol/l inhibited significantly reduction of battery capacity after storage.

EXAMPLE 4

Batteries of the present invention were prepared in the same manner as Example 1 except that 3,5-dimethyl isooxazole or pyridine was added at a range of 0.001~20.0 wt % on the basis of the nonaqueous electrolyte.

Storage property of the batteries was tested in the same manner as Example 1. Results are shown in Table 4.

TABLE 4

| | Self-discharge rate (%) | |
|---|---|---|
| Amount of added (wt %) | 3,5-Dimethyl isooxazole | Pyridine |
| 0 | 4.2 | 4.2 |
| 0.001 | 4.2 | 4.1 |
| 0.01 | 3.2 | 3.2 |
| 0.1 | 1.8 | 1.6 |
| 1.0 | 2.1 | 1.9 |
| 5.0 | 2.3 | 2.2 |
| 10.0 | 3.2 | 3.2 |
| 20.0 | 4.2 | 4.2 |

When the nitrogen compounds were added at a range of 0.01~10.0 wt % to weight of the nonaqueous electrolyte, reduction of self-discharge after storage was significantly inhibited.

ADVANTAGES OF THE INVENTION

A battery in which an electrolytic solute represented by LiN$(C_mF_{2m+1}SO_2)(C_nF_{2n+1}SO_2)$ (1) (where m is a natural number of 1 or greater, and n is a natural number of 2 or greater) is added to an nonaqueous electrolyte including 10.0 wt % of dioxolane has improved storage property. Industrial value of the present invention is significant.

What is claimed is:

1. A nonaqueous electrolyte battery comprising a positive electrode, a negative electrode containing lithium or a material capable of occluding and discharging lithium, and a nonaqueous electrolyte including a solvent containing dioxolane or a substituted dioxolane in an amount of at least 10 wt %, wherein said nonaqueous electrolyte contains an electrolyte solute represented by formula (1)

$$LiN(C_mF_{2m+1}SO_2)(C_nF_{2n+1}SO_2) \quad (1)$$

where m is a natural number of 1 or greater, and n is a natural number of 2 or greater,
wherein said nonaqueous electrolyte further contains a nitrogen-containing compound other than said electrolyte solute, said nitrogen-containing compound being a cyclic nitrogen-containing compound.

2. A nonaqueous electrolyte battery according to claim 1, which is a secondary battery.

3. A nonaqueous electrolyte battery according to claim 1, wherein said negative electrode comprises metallic lithium.

4. A nonaqueous electrolyte battery according to claim 2, wherein said negative electrode comprises metallic lithium.

5. A nonaqueous electrolyte battery according to claim 1, wherein a range of said electrolytic solute is 0.1~2.0 mol/l per 1 l of the nonaqueous electrolyte.

6. A nonaqueous electrolyte battery according to claim 2, wherein a range of said electrolytic solute is 0.1~2.0 mol/l per 1 l of the nonaqueous electrolyte.

7. A nonaqueous electrolyte battery according to claim 1, wherein m is 1 or 2, and n is 2, 3 or 4 in formula (1).

8. A nonaqueous electrolyte battery according to claim 2, wherein m is 1 or 2, and n is 2, 3 or 4 in formula (1).

9. A nonaqueous electrolyte battery according to claim 1, wherein said nitrogen-containing compound is contained in an amount within a range of 0.01~10.0 wt % of the nonaqueous electrolyte.

10. A nonaqueous electrolyte battery according to claim 2, wherein said nitrogen-containing compound is contained in an amount within a range of 0.01~10.0 wt % of the nonaqueous electrolyte.

11. A nonaqueous electrolyte battery according to claim 1, wherein said nitrogen-containing compound is contained in an amount within a range of 0.01~10.0 wt % of the nonaqueous electrolyte.

12. A nonaqueous electrolyte battery according to claim 2, wherein said nitrogen-containing compound is contained in an amount within a range of 0.01~10.0 wt % of the nonaqueous electrolyte.

13. A nonaqueous electrolyte battery according to claim 1, wherein said nitrogen-containing compound is 3,5-dimethyl isooxazole or pyridine.

14. A nonaqueous electrolyte battery according to claim 2, wherein said nitrogen-containing compound is 3,5-dimethyl isooxazole or pyridine.

* * * * *

UNITED STATES PATENT AND TRADEMARK OFFICE
CERTIFICATE OF CORRECTION

PATENT NO. : 6,221,533 B1
DATED : April 24, 2001
INVENTOR(S) : Yasuyuki Kusumoto et al.

It is certified that error appears in the above-identified patent and that said Letters Patent is hereby corrected as shown below:

Title page,
Item (56), "References Cited", after "U.S. PATENT DOCUMENTS", insert:

| | | | |
|---|---|---|---|
| 4,737,424 | 04/1988 | Tobishima et al. | 429/197 |
| 5,478,673 | 12/1995 | Funatsu | 429/197 |
| 5,558,953 | 09/1996 | Matsui et al. | 429/194 |

After "FOREIGN PATENT DOCUMENTS", insert:

| | | |
|---|---|---|
| 62-90869 | 04/1987 | (JP) |
| 62-219475 | 09/1987 | (JP) |

After "OTHER PUBLICATIONS", insert:

Abstract pf 62-15771    01/1987    (JP)

Signed and Sealed this

Twenty-eighth Day of August, 2001

Attest:

NICHOLAS P. GODICI
*Attesting Officer*    *Acting Director of the United States Patent and Trademark Office*